(12) United States Patent
Shimotani et al.

(10) Patent No.: US 12,100,228 B2
(45) Date of Patent: Sep. 24, 2024

(54) TRAVEL ENVIRONMENT ANALYSIS APPARATUS, TRAVEL ENVIRONMENT ANALYSIS SYSTEM, AND TRAVEL ENVIRONMENT ANALYSIS METHOD

(71) Applicant: MITSUBISHI ELECTRIC CORPORATION, Tokyo (JP)

(72) Inventors: Mitsuo Shimotani, Tokyo (JP); Tadashi Miyahara, Tokyo (JP); Yoshinori Ueno, Tokyo (JP); Tomohiro Shiino, Tokyo (JP); Kuniyo Ieda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 517 days.

(21) Appl. No.: 17/431,558

(22) PCT Filed: Apr. 24, 2019

(86) PCT No.: PCT/JP2019/017393
§ 371 (c)(1),
(2) Date: Aug. 17, 2021

(87) PCT Pub. No.: WO2020/217337
PCT Pub. Date: Oct. 29, 2020

(65) Prior Publication Data
US 2022/0139093 A1    May 5, 2022

(51) Int. Cl.
*G06V 20/56* (2022.01)
*G06V 20/59* (2022.01)

(52) U.S. Cl.
CPC ............ *G06V 20/59* (2022.01); *G06V 20/588* (2022.01)

(58) Field of Classification Search
None
See application file for complete search history.

(56) References Cited

U.S. PATENT DOCUMENTS

| 8,085,140 B2 * | 12/2011 | Mochizuki | B60W 40/02 340/576 |
| 11,688,184 B2 * | 6/2023 | Austin | B60Q 1/5035 701/23 |

(Continued)

FOREIGN PATENT DOCUMENTS

| JP | 2008-157661 A | 7/2008 |
| JP | 2009-31065 A | 2/2009 |

(Continued)

OTHER PUBLICATIONS

International Search Report, issued in PCT/JP2019/017393, PCT/ISA/210, dated Jul. 16, 2019.

(Continued)

*Primary Examiner* — Tsung Yin Tsai
(74) *Attorney, Agent, or Firm* — Birch, Stewart, Kolasch & Birch, LLP

(57) ABSTRACT

An object is to provide a travel environment analysis apparatus that accurately estimates an event occurring outside of a vehicle. A travel environment analysis apparatus includes a gaze point concentration area detector, a gaze point concentration area event estimation unit, and an information output unit. The gaze point concentration area detector sequentially detects a gaze point concentration area that is an area outside of a plurality of vehicles and gazed by occupants of the plurality of vehicles, based on line-of-sight information related to lines of sight of the occupants. The gaze point concentration area event estimation unit estimates, when a new gaze point concentration area which is a gaze point concentration area newly coming up is detected, an event occurring in the new gaze point concentration area. The information output unit outputs information of the new gaze point concentration area and information of the event.

20 Claims, 17 Drawing Sheets

(56) References Cited

U.S. PATENT DOCUMENTS

| | | | | |
|---|---|---|---|---|
| 2005/0107952 | A1* | 5/2005 | Hoshino | G01C 21/36 340/995.27 |
| 2009/0299857 | A1* | 12/2009 | Brubaker | G06Q 30/02 455/99 |
| 2009/0303078 | A1* | 12/2009 | Mochizuki | G08G 1/166 340/901 |
| 2016/0304126 | A1* | 10/2016 | Yamaoka | B60K 35/00 |
| 2017/0185146 | A1* | 6/2017 | Groh | B60Q 9/00 |
| 2018/0229725 | A1* | 8/2018 | Akama | G06V 20/584 |
| 2019/0016188 | A1* | 1/2019 | Hachisuka | B60G 17/016 |
| 2020/0159366 | A1* | 5/2020 | Matsuda | G10L 15/22 |
| 2020/0247434 | A1* | 8/2020 | Kim | G08G 1/166 |
| 2021/0174573 | A1* | 6/2021 | Itou | G06F 3/167 |
| 2021/0394793 | A1* | 12/2021 | Austin | G08G 1/0112 |
| 2022/0019824 | A1* | 1/2022 | G?nzel | G06Q 30/0242 |
| 2022/0081009 | A1* | 3/2022 | Oba | B60W 60/0059 |
| 2022/0161813 | A1* | 5/2022 | Oba | B60K 35/80 |
| 2022/0194427 | A1* | 6/2022 | Zheng | G06Q 50/40 |

FOREIGN PATENT DOCUMENTS

| | | | |
|---|---|---|---|
| JP | 2016-71492 A | 5/2016 | |
| JP | 2017-100562 A | 6/2017 | |

OTHER PUBLICATIONS

Japanese Office Action for Japanese Application No. 2021-515372, dated Jan. 11, 2022, with an English translation.

\* cited by examiner

F I G. 1
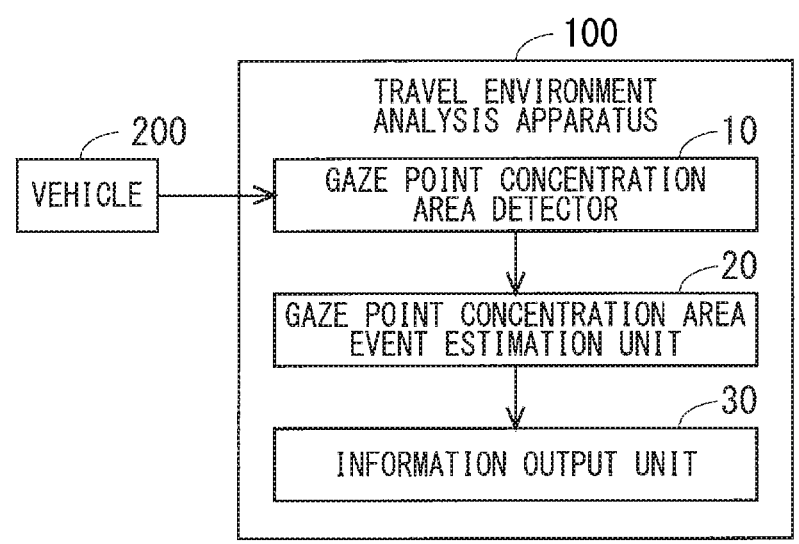

FIG. 10
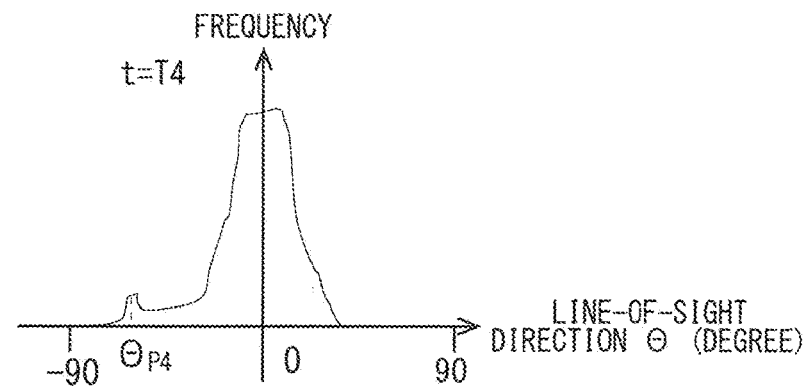
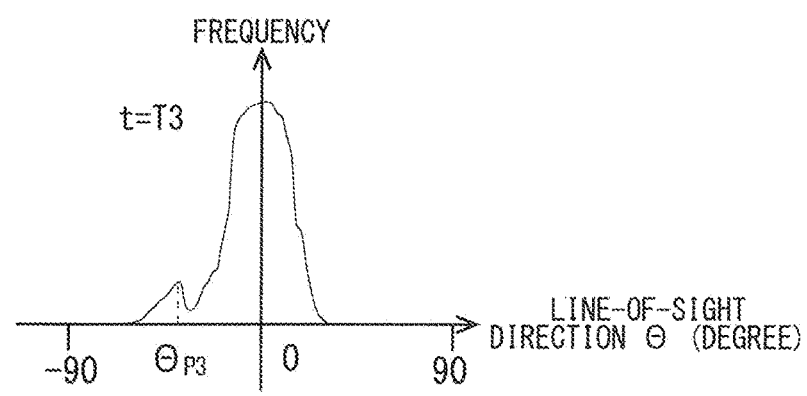
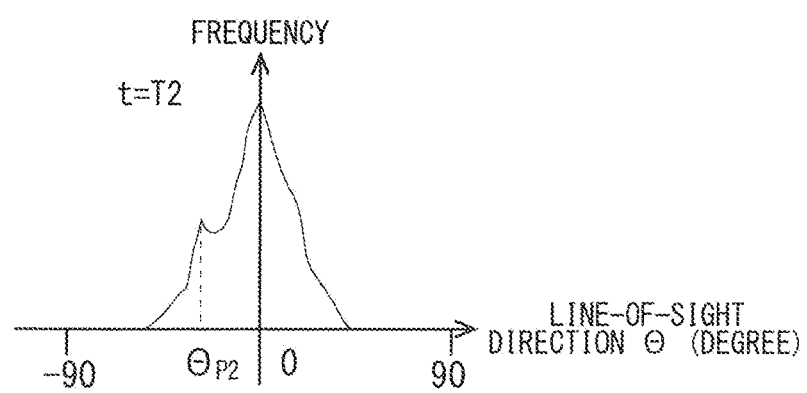
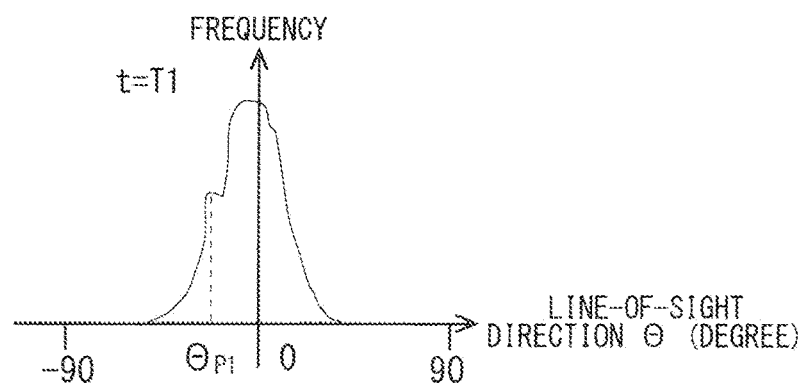

F I G. 1 6

|  |  | TEMPORAL ATTRIBUTE | | | |
|---|---|---|---|---|---|
|  |  | \<FIRST TEMPORAL ATTRIBUTE\> POSITION FIXED (SEVERAL TENS OF MINUTES TO SEVERAL HOURS) | \<SECOND TEMPORAL ATTRIBUTE\> POSITION FIXED (GRADUALLY INCREASE OVER SEVERAL MONTHS) | \<THIRD TEMPORAL ATTRIBUTE\> POSITION FIXED (START TO OCCUR FROM CERTAIN TIME POINT) | \<FOURTH TEMPORAL ATTRIBUTE\> CONTINUOUSLY MOVE |
| GEOGRAPHICAL ATTRIBUTE | \<FIRST GEOGRAPHICAL ATTRIBUTE\> ON ANY TRAFFIC LANE OF TRAVELLING ROAD OF VEHICLE | ·VEHICLE INVOLVED IN ACCIDENT OR OBSTRUCTION EXISTS | ·ROAD DAMAGE IS PROGRESSING | ·ROAD IS DESTRUCTED | ·DANGEROUSLY DRIVEN VEHICLE EXISTS |
|  | \<SECOND GEOGRAPHICAL ATTRIBUTE\> NEAR TRAFFIC LANE OF TRAVELLING ROAD OF VEHICLE | ·VEHICLE INVOLVED IN ACCIDENT, STANDBY VEHICLE OR OBSTRUCTION EXISTS ·MOVING OBJECT TO BE PAID ATTENTION TO OR POI TO BE PAID ATTENTION TO EXISTS | ·DAMAGE OF ROAD FACILITY IS PROGRESSING | ·ROAD FACILITY IS DESTRUCTED | ·PEDESTRIAN THAT REQUIRES ATTENTION, WANDERING PERSON, OR DANGEROUS PERSON EXISTS ·BICYCLE THAT REQUIRES ATTENTION EXISTS |
|  | \<THIRD GEOGRAPHICAL ATTRIBUTE\> ABOVE TRAVELLING ROAD OF VEHICLE | ·HINDRANCE TO TRAVELLING OCCURS | ·DAMAGE OF ROAD FACILITY IS PROGRESSING | ·NATURAL DISASTER OCCURS | ·HINDRANCE TO TRAVELLING OCCURS |
|  | \<FOURTH GEOGRAPHICAL ATTRIBUTE\> ROAD DIFFERENT FROM TRAVELLING ROAD OF VEHICLE (INCLUDING ONCOMING TRAFFIC LANE) | ·ACCIDENT OCCURS | ·DAMAGE OF ROAD FACILITY IS PROGRESSING | ·ROAD FACILITY IS DESTRUCTED | ·REVERSELY TRAVELLING VEHICLE OR DANGEROUSLY DRIVEN VEHICLE EXISTS |
|  | \<FIFTH GEOGRAPHICAL ATTRIBUTE\> OUTSIDE OF FACILITY OF TRAVELLING ROAD OF VEHICLE | ·BEAUTIFUL VIEW OCCURS ·FIRE OCCURS | ·DESTRUCTION OF NATURE IS PROGRESSING ·AUTUMN FOLIAGE OR CHERRY BLOSSOM FRONT IS PROGRESSING | ·DISASTER OCCURS ·NEW POI OCCURS | ·MOVEMENT OF VIEW OCCURS ·SUNSET OCCURS ·MOVEMENT OF SHIP OCCURS |

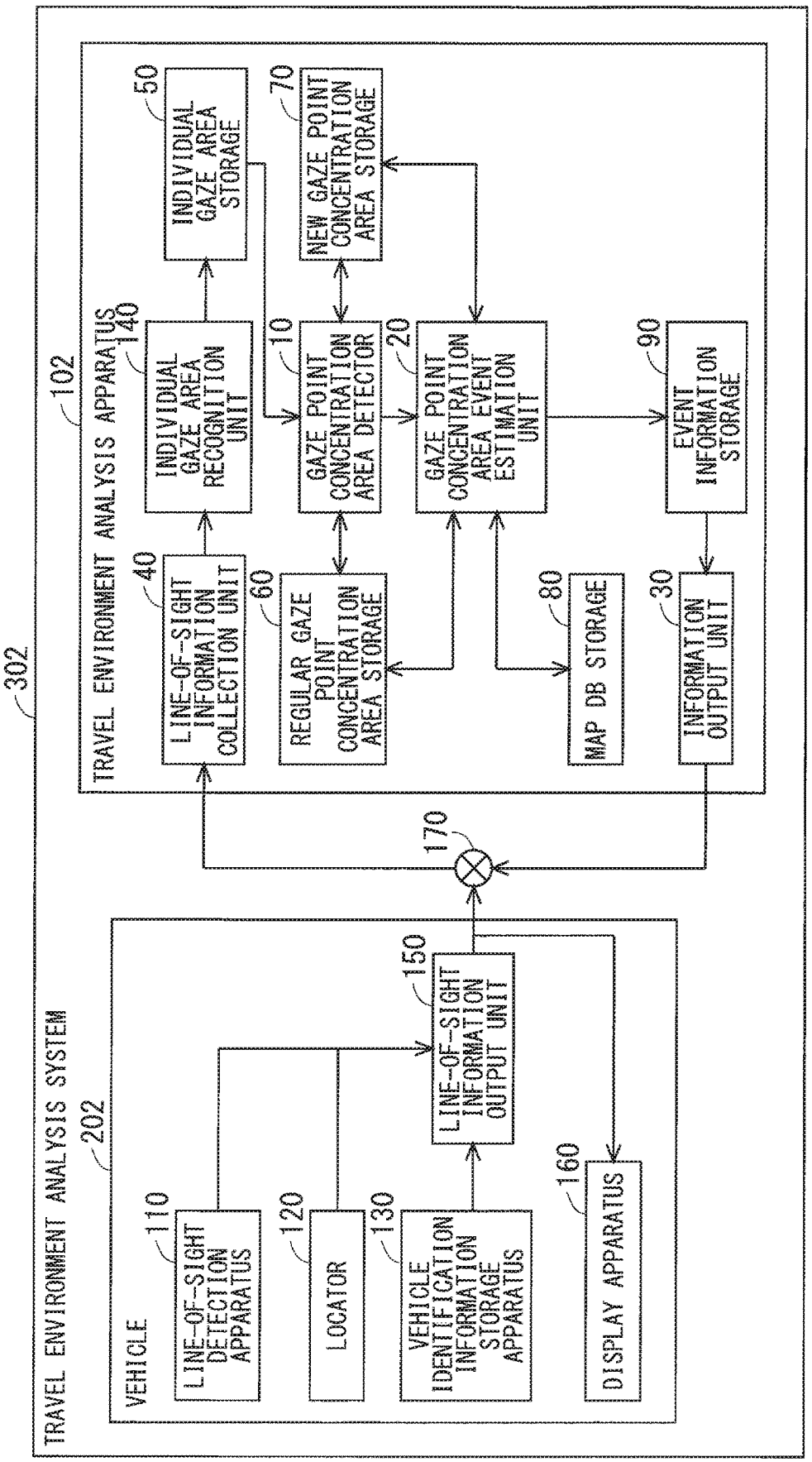

TRAVEL ENVIRONMENT ANALYSIS APPARATUS, TRAVEL ENVIRONMENT ANALYSIS SYSTEM, AND TRAVEL ENVIRONMENT ANALYSIS METHOD

TECHNICAL FIELD

The present invention relates to a travel environment analysis apparatus, a travel environment analysis system, and a travel environment analysis method.

BACKGROUND ART

A system of detecting a line of sight of a driver during travelling and performing various types of assist for the driver has been proposed. For example, a drive control apparatus disclosed in Patent Document 1 performs predetermined drive operation, when time series data of a line of sight associated with the predetermined drive operation, which is data stored in advance, and an actually detected line of sight of the driver match each other. An information introduction apparatus disclosed in Patent Document 2 detects a line-of-sight direction of an occupant in a predetermined period, and introduces a facility corresponding to a selected genre out of facilities existing in the line-of-sight direction.

In these systems, the line of sight of only an occupant riding in one vehicle is detected, and direct assist is performed only for the one vehicle, or only for the occupant from which the line of sight is detected.

PRIOR ART DOCUMENTS

Patent Documents

Patent Document 1: Japanese Patent Application Laid-Open No. 2017-100562
Patent Document 2: Japanese Patent Application Laid-Open No. 2009-031065

SUMMARY

Problem to be Solved by the Invention

When an event is occurring outside of vehicles, generally, occupants of a plurality of vehicles look at the event. However, with the above-described systems in which assist is executed through acquisition of only the line of sight of the occupant of one vehicle, the event outside of the vehicles cannot be accurately detected and the details of the event cannot be accurately estimated.

The present invention is made in order to solve the problem as described above, and has an object to provide a travel environment analysis apparatus that accurately estimates an event occurring outside of a vehicle.

Means to Solve the Problem

A travel environment analysis apparatus according to the present invention includes a gaze point concentration area detector, a gaze point concentration area event estimation unit, and an information output unit. The gaze point concentration area detector sequentially detects a gaze point concentration area that is an area outside of a plurality of vehicles and gazed by occupants of the plurality of vehicles, based on line-of-sight information related to lines of sight of the occupants. The gaze point concentration area event estimation unit estimates, when a new gaze point concentration area which is a gaze point concentration area newly coming up is detected, an event occurring in the new gaze point concentration area. The information output unit outputs information of the new gaze point concentration area and information of the event.

Effects of the Invention

According to the present invention, a travel environment analysis apparatus that accurately estimates an event occurring outside of a vehicle can be provided.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram illustrating a configuration of a travel environment analysis apparatus according to the first embodiment.
FIG. 10 is a diagram illustrating time series data of the line-of-sight distribution data.
FIG. 16 is a diagram illustrating a relationship between geographical attributes and temporal attributes of the new gaze point concentration area and estimated events.
FIG. 17 is a block diagram illustrating a configuration of a travel environment analysis system and a travel environment analysis apparatus according to the third embodiment.

DESCRIPTION OF EMBODIMENTS

First Embodiment

Figure 2:
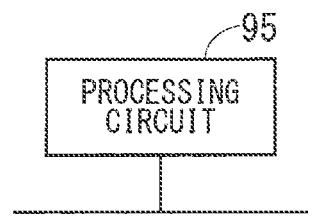
FIG. 2 is a diagram illustrating an example of a configuration of a processing circuit.

FIG. 1 is a block diagram illustrating a configuration of a travel environment analysis apparatus 100 according to the first embodiment.

The travel environment analysis apparatus 100 includes a gaze point concentration area detector 10, a gaze point concentration area event estimation unit 20, and an information output unit 30.

The gaze point concentration area detector 10 sequentially detects gaze point concentration areas on the basis of line-of-sight information related to lines of sight of occupants of a plurality of vehicles 200. The gaze point concentration area is an area outside of the plurality of vehicles 200 and gazed by the occupants.

When a new gaze point concentration area which is a gaze point concentration area newly coming up is detected, the gaze point concentration area event estimation unit 20 estimates an event that occurs in the new gaze point concentration area.

The information output unit 30 outputs information of the new gaze point concentration area and information of the event.

FIG. 2 is a diagram illustrating an example of a configuration of a processing circuit 95 included in the travel environment analysis apparatus 100. Each function of the gaze point concentration area detector 10, the gaze point concentration area event estimation unit 20, and the information output unit 30 is implemented by the processing circuit 95. Specifically, the processing circuit 95 includes the gaze point concentration area detector 10, the gaze point concentration area event estimation unit 20, and the information output unit 30.

If the processing circuit 95 is dedicated hardware, examples of the processing circuit 95 include a single circuit, a composite circuit, a programmed processor, a parallel-programmed processor, an application specific integrated circuit (ASIC), a field-programmable gate array (FPGA), or a circuit obtained by combining these or the like. Each function of the gaze point concentration area detector 10, the gaze point concentration area event estimation unit 20, and the information output unit 30 may be individually implemented by a plurality of processing circuits, or may be collectively implemented by one processing circuit.

Figure 3:
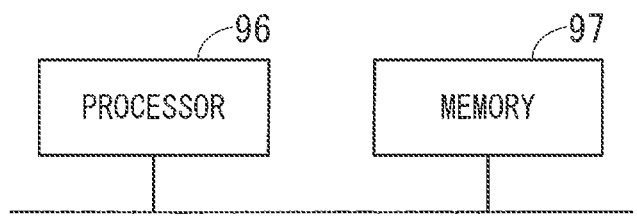
FIG. 3 is a diagram illustrating another example of the configuration of the processing circuit.

FIG. 3 is a diagram illustrating another example of the configuration of the processing circuit included in the travel environment analysis apparatus 100. The processing circuit includes a processor 96 and a memory 97. When the processor 96 executes a program stored in the memory 97, each function of the gaze point concentration area detector 10, the gaze point concentration area event estimation unit 20, and the information output unit 30 is implemented. For example, when software or firmware described as a program is executed by the processor 96, each function is implemented. In this manner, the travel environment analysis apparatus 100 includes the memory 97 that stores a program, and the processor 96 that executes the program.

The program describes a function of the travel environment analysis apparatus 100 sequentially detecting the gaze point concentration area that is an area outside of the plurality of vehicles 200 and gazed by occupants of the plurality of vehicles 200 on the basis of the line-of-sight information related to lines of sight of the occupants, when the new gaze point concentration area which is a gaze point concentration area newly coming up is detected, estimating an event occurring in the new gaze point concentration area, and outputting information of the new gaze point concentration area and information of the event. Further, the program causes a computer to execute procedures or methods of the gaze point concentration area detector 10, the gaze point concentration area event estimation unit 20, and the information output unit 30.

The processor 96 is, for example, a central processing unit (CPU), an arithmetic apparatus, a microprocessor, a microcomputer, a digital signal processor (DSP), or the like. Here, examples of the memory 97 include a non-volatile or volatile semiconductor memory, such as random access memory (RAM), read only memory (ROM), flash memory, erasable programmable read only memory (EPROM), and electrically erasable programmable read only memory (EEPROM). Alternatively, the memory 97 may be any storage medium that may be used ahead, such as a magnetic disk, a flexible disk, an optical disc, a compact disc, a MiniDisc, and a DVD.

A part of each function of the gaze point concentration area detector 10, the gaze point concentration area event estimation unit 20, and the information output unit 30 described above may be implemented by dedicated hardware, and another part thereof may be implemented by software or firmware. In this manner, the processing circuit may implement each function described above by using hardware, software, firmware, or a combination of these.

Figure 4:
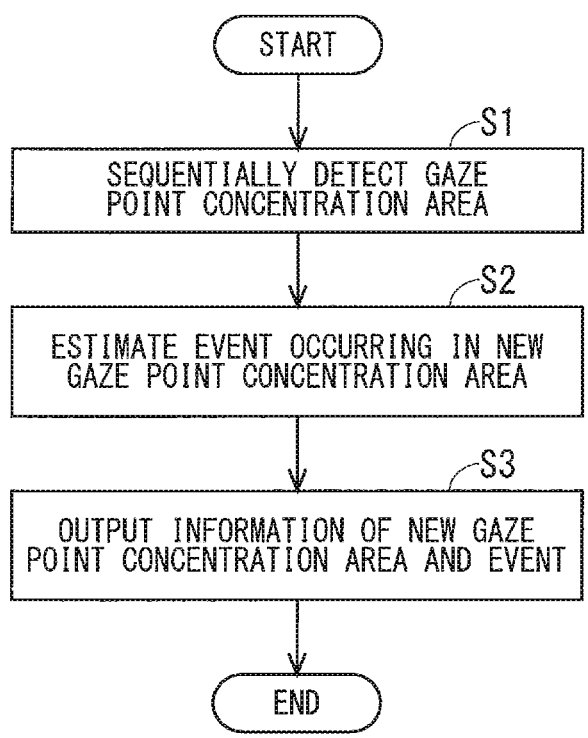
FIG. 4 is a flowchart illustrating a travel environment analysis method according to the first embodiment.

FIG. 4 is a flowchart illustrating a travel environment analysis method according to the first embodiment.

In Step S1, the gaze point concentration area detector 10 sequentially detects the gaze point concentration areas on the basis of line-of-sight information related to lines of sight of occupants.

In Step S2, when a new gaze point concentration area is detected, the gaze point concentration area event estimation unit 20 estimates an event that occurs in the new gaze point concentration area.

In Step S3, the information output unit 30 outputs information of the new gaze point concentration area and the event.

To summarize the above, the travel environment analysis apparatus 100 according to the first embodiment includes the gaze point concentration area detector 10, the gaze point concentration area event estimation unit 20, and the information output unit 30. The gaze point concentration area detector 10 sequentially detects the gaze point concentration area that is an area outside of the plurality of vehicles 200 and gazed by occupants of the plurality of vehicles 200, based on the line-of-sight information related to lines of sight of the occupants. When a new gaze point concentration area which is a gaze point concentration area newly coming up is detected, the gaze point concentration area event estimation unit 20 estimates an event occurring in the new gaze point concentration area. The information output unit 30 outputs information of the new gaze point concentration area and information of the event.

The travel environment analysis apparatus 100 as described above accurately estimates the event occurring outside of the vehicles 200.

Further, the travel environment analysis method according to the first embodiment include sequentially detecting the gaze point concentration area that is an area outside of the plurality of vehicles 200 and gazed by occupants of the plurality of vehicles 200, based on the line-of-sight information related to lines of sight of the occupants, when the new gaze point concentration area which is a gaze point concentration area newly coming up is detected, estimating an event occurring in the new gaze point concentration area, and outputting information of the new gaze point concentration area and information of the event.

With the travel environment analysis method as described above, the event occurring outside of the vehicles 200 is accurately estimated.

Second Embodiment

A travel environment analysis apparatus and a travel environment analysis method according to the second embodiment will be described. The second embodiment is a subordinate concept of the first embodiment, and the travel environment analysis apparatus according to the second embodiment includes each configuration of the travel environment analysis apparatus 100 according to the first embodiment. Note that description of configurations and operations similar to those of the first embodiment will be omitted.

Figure 5:
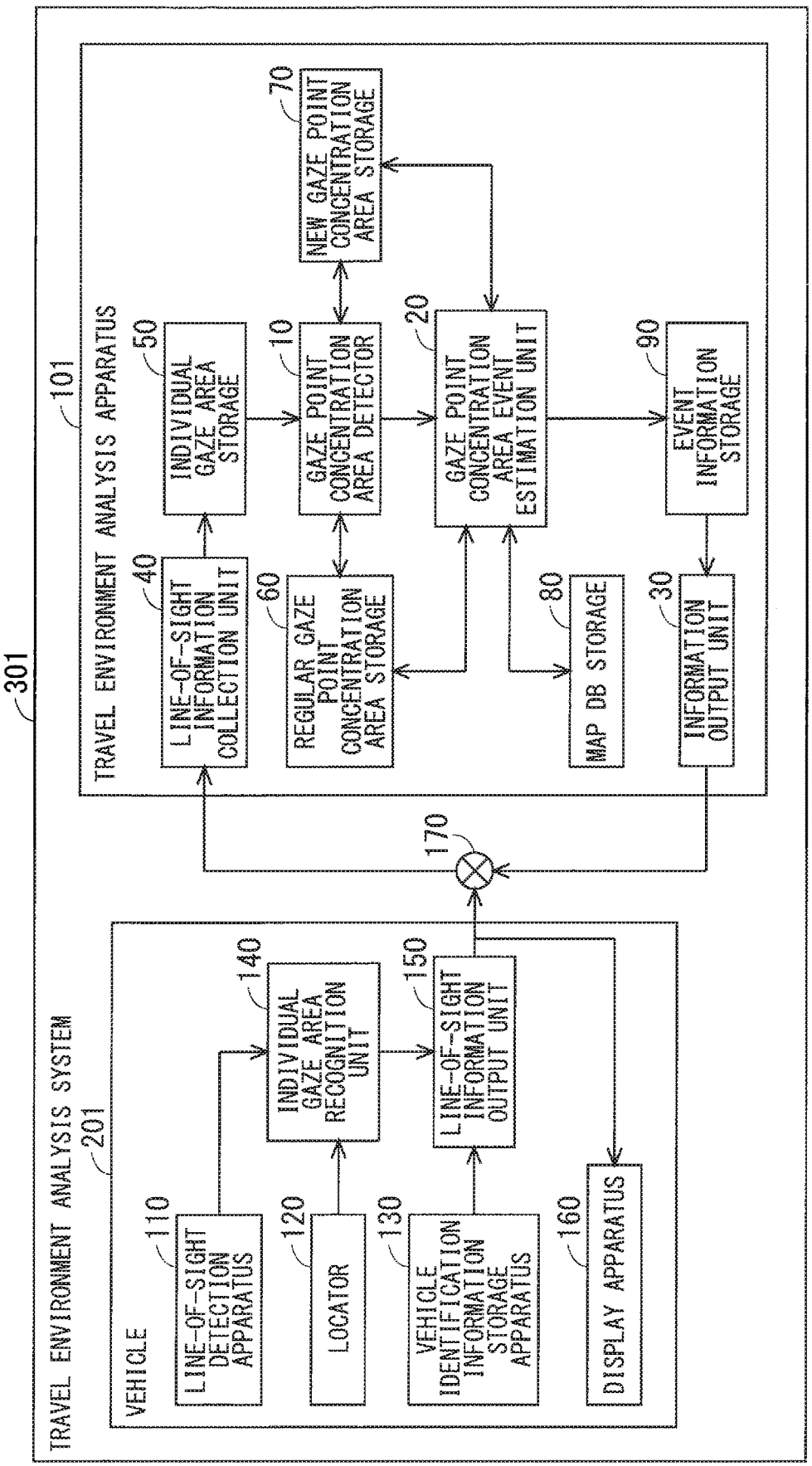
FIG. 5 is a block diagram illustrating a configuration of a travel environment analysis system and a travel environment analysis apparatus according to the second embodiment.

FIG. 5 is a block diagram illustrating a configuration of a travel environment analysis system 301 and a travel environment analysis apparatus 101 according to the second embodiment.

The travel environment analysis system 301 includes a plurality of vehicles 201 and the travel environment analysis apparatus 101. The vehicle 201 is a so-called a probe car, and communicates with the travel environment analysis apparatus 101 provided in a server (not illustrated) via a communication network 170. Note that FIG. 5 illustrates a configuration of one vehicle out of the plurality of vehicles 201 as a representative example. However, the same applies to configurations of other vehicles. The travel environment analysis system 301 recognizes, in each vehicle 201, an individual gaze area gazed by an occupant of each of the plurality of vehicles 201. Then, the travel environment analysis system 301 collects information of the individual gaze areas from the plurality of vehicles 201 as the line-of-sight information, and detects the new gaze point concentration area gazed by occupants of the plurality of vehicles 201 gaze. The travel environment analysis system 301 according to the second embodiment is a so-called edge computing system.

The vehicle 201 includes a line-of-sight detection apparatus 110, a locator 120, a vehicle identification information storage apparatus 130, an individual gaze area recognition unit 140, a line-of-sight information output unit 150, and a display apparatus 160.

The vehicle identification information storage apparatus 130 stores an ID associated with the vehicle 201, that is, vehicle identification information.

The locator 120 detects the position of the vehicle 201. The locator 120 detects the position of the vehicle 201, based on information acquired from the Global Navigation Satellite System (GNSS) or a sensor provided in the vehicle 201, for example.

The line-of-sight detection apparatus 110 detects line-of-sight data of the occupant of the vehicle 201 in sequence. The occupant includes, for example, a driver, an occupant sitting on the front passenger seat. The line-of-sight data includes a line-of-sight direction or a line-of-sight position.

The individual gaze area recognition unit 140 acquires position data of the vehicle 201 detected in the locator 120, and the line-of-sight data of individual occupants detected in the line-of-sight detection apparatus 110. The individual gaze area recognition unit 140 stores the line-of-sight data in a predetermined cycle and in a predetermined analysis period, and thereby calculates line-of-sight distribution data.

Further, the individual gaze area recognition unit 140 associates the position data of the vehicle 201 with the line-of-sight distribution data to acquire them over time. With this, time series data of the position data of the vehicle 201 and the line-of-sight distribution data is obtained. Based on the time series data, the individual gaze area recognition unit 140 recognizes the individual gaze area that is an area outside of the vehicle 201 and the area gazed by the individual occupants. The individual gaze area corresponds to, for example, an area occurring due to a sudden event such as a vehicle involved in an accident. Alternatively, the individual gaze area corresponds to an area at which the occupant regularly gazes due to a road structure, a road shape, or a facility. Note that the road structure is a crossing, a merging point, a crosswalk, or the like, the road shape is a curve of a road or the like, and the facility is a school or the like.

The line-of-sight information output unit 150 outputs information of the individual gaze area to the travel environment analysis apparatus 101 via the communication network 170 as line-of-sight information related to the line of sight of the occupant. The line-of-sight information related to the line of sight of the occupant may include the position data of the vehicle 201, the vehicle identification information, or time information.

The display apparatus 160 displays a warning based on the information of the new gaze point concentration area and the event output from the travel environment analysis apparatus 101. The display apparatus 160 is, for example, a head-up display (HUD), a monitor provided in a navigation apparatus, or the like.

The vehicle 201 includes a processing circuit similar to that of FIG. 2 or FIG. 3. The functions of the individual gaze area recognition unit 140 and the line-of-sight information output unit 150 are implemented by the processing circuit.

The travel environment analysis apparatus 101 is provided in a server. The travel environment analysis apparatus 101 includes a line-of-sight information collection unit 40, an individual gaze area storage 50, a gaze point concentration area detector 10, a regular gaze point concentration area storage 60, a new gaze point concentration area storage 70, a gaze point concentration area event estimation unit 20, a map database (map DB) storage 80, an event information storage 90, and an information output unit 30.

The line-of-sight information collection unit 40 collects the line-of-sight information from each vehicle 201. The line-of-sight information according to the second embodiment includes the information of the individual gaze area recognized in each vehicle 201.

The individual gaze area storage 50 stores the information of the individual gaze area of each vehicle 201 collected through the line-of-sight information collection unit 40.

The gaze point concentration area detector 10 sequentially detects a gaze point concentration area on the basis of the plurality of individual gaze areas acquired from the plurality of vehicles 201. In other words, the gaze point concentration area detector 10 extracts the gaze point concentration areas from the plurality of individual gaze areas collected through the line-of-sight information collection unit 40. The gaze point concentration area is an area outside of the plurality of vehicles 201 and the area gazed by the occupants of the plurality of vehicles 201.

Further, the gaze point concentration area detector 10 detects the regular gaze point concentration area from the gaze point concentration area on the basis of a predetermined first logic. The predetermined first logic includes storing information of the gaze point concentration area in a past predetermined period and thereby setting an area with high frequency that the line of sight of the occupant concentrates as the regular gaze point concentration area. Alternatively, the predetermined first logic includes storing the individual concentration area in a past predetermined period and thereby setting an area with high frequency of being detected as the individual concentration area as the regular gaze point concentration area. Thus, the regular gaze point concentration area corresponds to an area at which the occupant regularly gazes due to a road structure, a road shape, a facility, or the like. Then, the gaze point concentration area detector 10 determines that a new gaze point concentration area has occurred when the gaze point concentration area detector 10 detects occurrence of a gaze point concentration area in an area different from the regular gaze point concentration area before and after a specific time point.

The regular gaze point concentration area storage 60 stores information of the regular gaze point concentration area.

The new gaze point concentration area storage 70 stores information of the new gaze point concentration area.

The map DB storage 80 stores road map information.

When a new gaze point concentration area is detected, the gaze point concentration area event estimation unit 20 estimates an event occurring in the new gaze point concentration area. For example, the gaze point concentration area event estimation unit 20 estimates the event on the basis of a geographical attribute of the new gaze point concentration area. In this case, the gaze point concentration area event estimation unit 20 acquires the geographical attribute of the new gaze point concentration area on the basis of the position of the new gaze point concentration area and map information. The geographical attribute refers to, for example, on a traffic lane, outside a traffic lane, outside a travelling traffic lane, a zone farther than a travelling traffic lane, or the like. Then, the gaze point concentration area event estimation unit 20 estimates the event on the basis of the geographical attribute. Alternatively, for example, the gaze point concentration area event estimation unit 20 estimates the event on the basis of a temporal attribute that is a time-dependent change of a state of the new gaze point concentration area. The event includes, for example, an event that needs to be avoided, which is an event that the vehicle 201 needs to avoid, or an event that requires attention, which is an event that the occupant of the vehicle 201 needs to pay attention to.

The event information storage 90 stores the event estimated by the gaze point concentration area event estimation unit 20.

The information output unit 30 outputs information of the new gaze point concentration area and information of the event.

The travel environment analysis apparatus 101 includes a processing circuit similar to that of FIG. 2 or FIG. 3. Each function of the line-of-sight information collection unit 40, the individual gaze area storage 50, the gaze point concentration area detector 10, the regular gaze point concentration area storage 60, the new gaze point concentration area storage 70, the gaze point concentration area event estimation unit 20, the map DB storage 80, the event information storage 90, and the information output unit 30 is implemented by the processing circuit.

Figure 6:
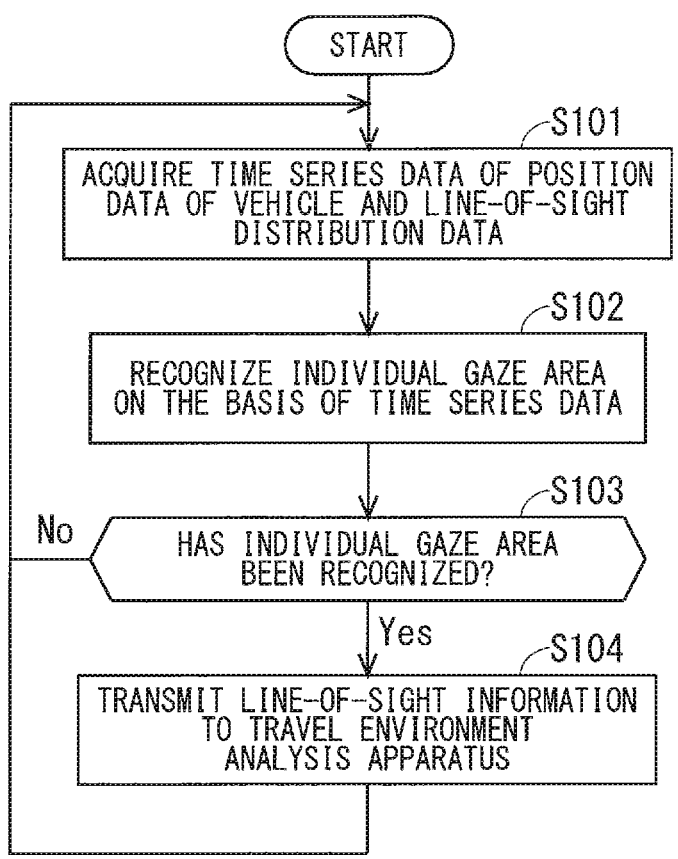
FIG. 6 is a flowchart illustrating recognition operation of an individual gaze area according to the second embodiment.

Next, the travel environment analysis method will be described. First, a method of recognizing the individual gaze area in the vehicle 201 will be described. FIG. 6 is a flowchart illustrating operation of recognizing the individual gaze area according to the second embodiment.

In Step S101, the individual gaze area recognition unit 140 acquires position data of the vehicle 201 and line-of-sight data of occupants. The individual gaze area recognition unit 140 stores the line-of-sight data of individual occupants in a predetermined cycle and in a predetermined period, and thereby calculates line-of-sight distribution data. The predetermined cycle is 30 times per second, for example, and the predetermined analysis period is 2 seconds, for example. The individual gaze area recognition unit 140 associates the position data of the vehicle 201 with the line-of-sight distribution data to acquire them over time, and thereby acquires time series data. Note that, preferably, the position of the vehicle 201 is the positions of the eyes of a driver.

In Step S102, the individual gaze area recognition unit 140 recognizes the individual gaze area on the basis of the time series data. The details of the recognition method will be described later.

In Step S103, the individual gaze area recognition unit 140 determines whether or not the individual gaze area has been recognized. If the individual gaze area is recognized, Step S104 is executed. If the individual gaze area is not recognized, Step S101 is executed again.

In Step S104, the line-of-sight information output unit 150 transmits information of the individual gaze area to the travel environment analysis apparatus 101 as the line-of-sight information related to the line of sight of the occupant. The information of the individual gaze area includes position data of the individual gaze area. Further, the line-of-sight information includes, the position data of the vehicle 201, the vehicle identification information, and the time information, as well as the information of the individual gaze area.

The vehicle 201 can be identified based on the time series information of the position data of the vehicle 201, and thus the line-of-sight information output unit 150 need not necessarily upload the vehicle identification information to the travel environment analysis apparatus 101. However, if the vehicle identification information is added to the line-of-sight information, processing in the travel environment analysis apparatus 101 is reduced.

In each vehicle 201 of the travel environment analysis system 301, the recognition processing of the individual gaze area described above is repeatedly executed.

Figure 7:
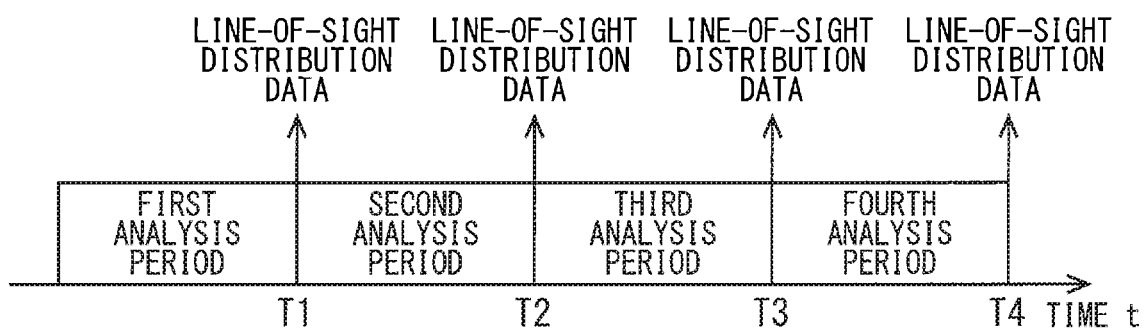
FIG. 7 is a diagram illustrating an example of a predetermined analysis period and output timing of line-of-sight distribution data.
Figure 8:
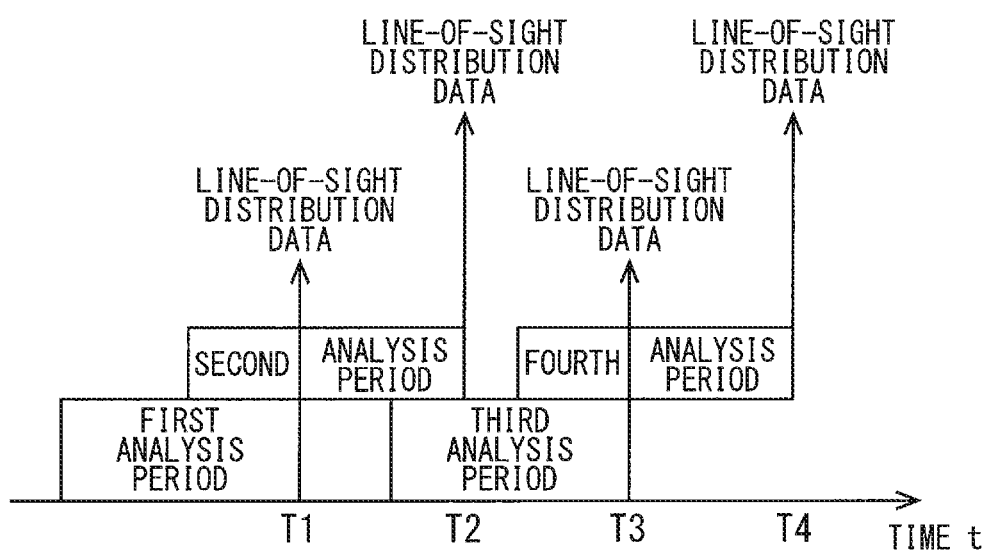
FIG. 8 is a diagram illustrating another example of the predetermined analysis period and the output timing of the line-of-sight distribution data.

Next, the details of the method of acquiring the time series data in Step S101 described above will be described. FIG. 7 and FIG. 8 are each a diagram illustrating an example of the predetermined analysis period and output timing of the line-of-sight distribution data.

Each of the first to fourth analysis periods corresponds to the predetermined analysis period described above. The analysis periods may overlap with each other as illustrated in FIG. 8, or may be independent of each other as illustrated in FIG. 7. When the predetermined cycle is 30 times per second and the predetermined analysis period is 2 seconds, the individual gaze area recognition unit 140 acquires 60 sets of the position data of the vehicle 201 and the line-of-sight data in each analysis period. Then, the individual gaze area recognition unit 140 calculates the line-of-sight distribution data on the basis of the 60 sets of data storing those. As illustrated in FIG. 7 and FIG. 8, the line-of-sight distribution data is output when each analysis period ends (time t=T1 to T4), for example. With the method as described above, the individual gaze area recognition unit 140 acquires the time series data that is time-dependent data of the position data of the vehicle 201 and the line-of-sight distribution data.

Figure 9:
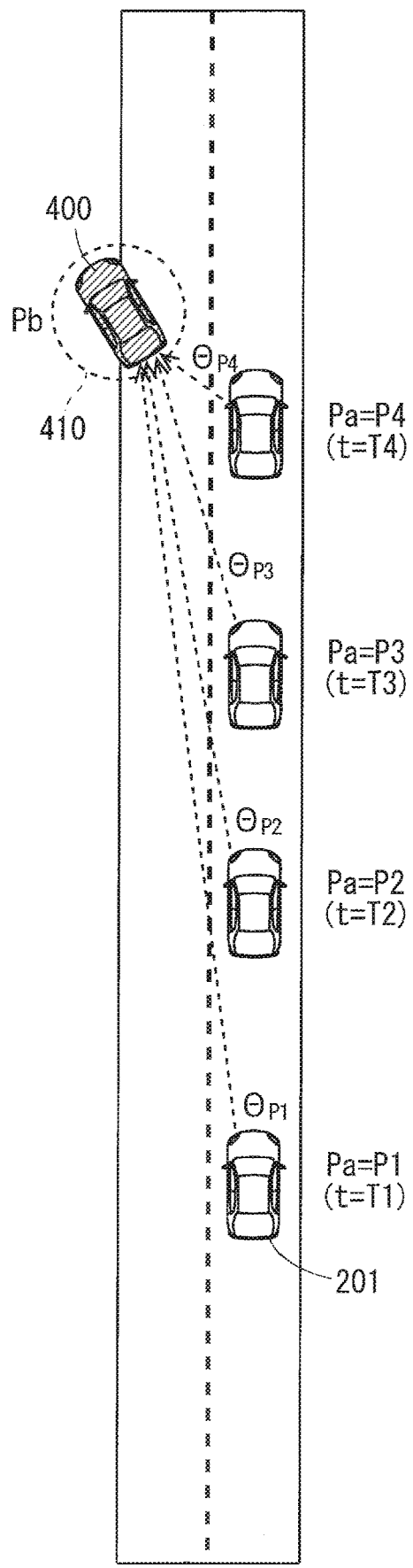
FIG. 9 is a diagram illustrating an example of positions of a vehicle and an individual gaze area.

Next, the details of the method of recognizing of the individual gaze area based on the time series data in Step S102 described above will be described. FIG. 9 is a diagram illustrating an example of the positions of the vehicle 201 and an individual gaze area 410. Note that the description herein describes the line of sight of the driver as the line of sight of the occupant.

A vehicle 400 involved in an accident drifts off the traffic lane of a road and stops at the shoulder. The position at which the vehicle 400 involved in the accident stops is represented by Pb. When the vehicle 201 travels near the position Pb of the vehicle 400 involved in the accident, the occupant of the vehicle 201 notices the vehicle 400 involved in the accident, and looks at the vehicle 400 involved in the accident sometimes. As the time t passes (t=T1 to T4), a position Pa of the vehicle 201 moves as follows: Pa=P1→P2→P3→P4. Similarly, as the time t passes (t=T1 to T4), a direction from the vehicle 201 to the vehicle 400 involved in the accident, that is, a line-of-sight direction Θ of the driver, changes as follows: Θ=Θ1→ΘP2→Θ3→Θ4. Here, the line-of-sight direction Cs corresponds to an angle formed between the forward direction of the vehicle 201 and a direction in which the vehicle 400 involved in the accident exists with respect to the vehicle 201.

FIG. 10 is a diagram illustrating time series data of the line-of-sight distribution data. The time series data includes four pieces of line-of-sight distribution data corresponding to time t=T1 to T4.

When the vehicle 201 travels on a straight road, the driver usually faces frontward. The line-of-sight distribution data of the driver in this case indicates such distribution that line-of-sight frequency of line-of-sight direction Θ=0° is the highest.

As illustrated in FIG. 9, in a situation in which the vehicle 400 involved in the accident exists, the driver of the vehicle 201 looks at the vehicle 400 involved in the accident. Thus, the line-of-sight distribution data has a local maximum value (peak) at a specific angle in the left direction, that is, a direction in which the vehicle 400 involved in the accident exists.

For example, the line-of-sight distribution data at t=T1 has a small peak at line-of-sight direction Θ=ΘP1. Similarly, the line-of-sight distribution data at time t=T2, T3, and T4 also has a small peak at line-of-sight direction Θ=ΘP2, ΘP3, and ΘP4, respectively.

The individual gaze area recognition unit 140 calculates the individual gaze area 410 on the basis of the peaks at specific angles included in these pieces of line-of-sight distribution data.

Ideally, four straight lines extending from four positions Pa (=P1 to P4) to the line-of-sight directions Θ (=ΘP1 to ΘP4) intersect at one point, and the position Pb of the vehicle 400 involved in the accident is thus calculated. However, with detection errors of the line-of-sight direction Θ and the like being taken into consideration, the individual gaze area recognition unit 140 calculates the position Pb through statistical processing such as the least squares method, and recognizes the position Pb as the individual gaze area 410.

The individual gaze area is not limited to one specific location as the position Pb described above, and may be an area including the specific location. For example, when intersections of all of the straight lines calculated based on the line-of-sight distribution data are present in a predetermined range, the individual gaze area recognition unit 140 may recognize the range as the individual gaze area 410.

If there are times when the driver of the vehicle 201 does not look at the vehicle 400 involved in the accident, the peaks described above are not present in the line-of-sight distribution at those times. Such line-of-sight distribution is not valid data for detecting the individual gaze area. Thus, the individual gaze area recognition unit 140 may operate such that the individual gaze area recognition unit 140 does not adopt the line-of-sight distribution data whose time series data does not have peaks for recognition of the individual gaze area.

As the vehicle 201 approaches the position Pb of the vehicle 400 involved in the accident, the absolute value of the line-of-sight direction Θ based on the positional relationship between the vehicle 201 and the vehicle 400 involved in the accident monotonically increases. The individual gaze area recognition unit 140 need not adopt peaks that deviate from tendency of the monotonic increase for recognition of the individual gaze area.

After the vehicle 201 overtakes the vehicle 400 involved in the accident, the driver may visually recognize the vehicle 400 involved in the accident with a rearview mirror, an electronic mirror, or the like. Thus, the individual gaze area recognition unit 140 may recognize the individual gaze area on the basis of the line-of-sight distribution data of the driver looking at the rearview mirror, the electronic mirror, or the like.

The method of detecting the individual gaze area in each vehicle 201 is not limited to the method described above.

When a clear point of intersection converges in a range of 2 m and remarkable peaks of the line-of-sight distribution are detected for a predetermined time period or more, the individual gaze area recognition unit 140 may recognize the point of intersection as the individual gaze area. The predetermined time period is, for example, 4 seconds.

When there is a point at which the occupant continuously gazed for 1 second or more, the individual gaze area recognition unit 140 may recognize the point as the individual gaze area. Alternatively, when a point at which the occupant continuously gazed for 0.5 seconds or more is detected three times or more within 10 seconds, the individual gaze area recognition unit 140 may recognize the point as the individual gaze area. Alternatively, the individual gaze area recognition unit 140 may calculate the individual gaze area with a deep learning logic.

Figure 11:
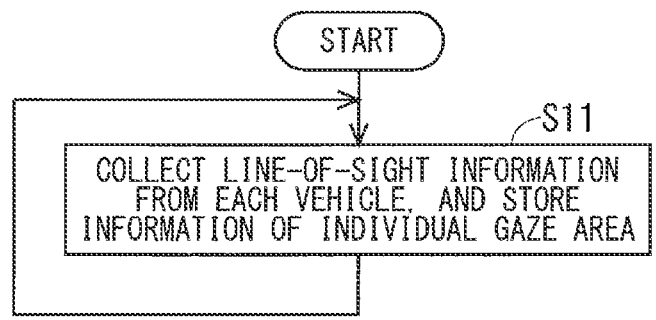
FIG. 11 is a flowchart illustrating a method of collecting line-of-sight information according to the second embodiment.
Figure 12:
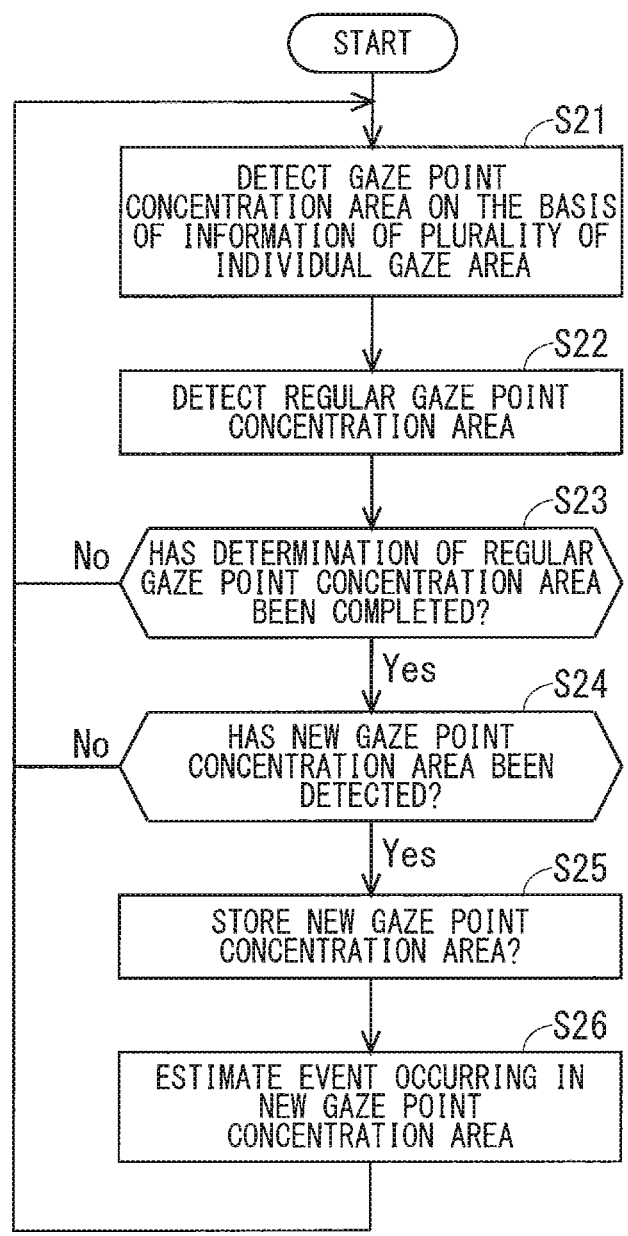
FIG. 12 is a flowchart illustrating a method of detecting a new gaze point concentration area and a method of estimating an event according to the second embodiment.
Figure 13:
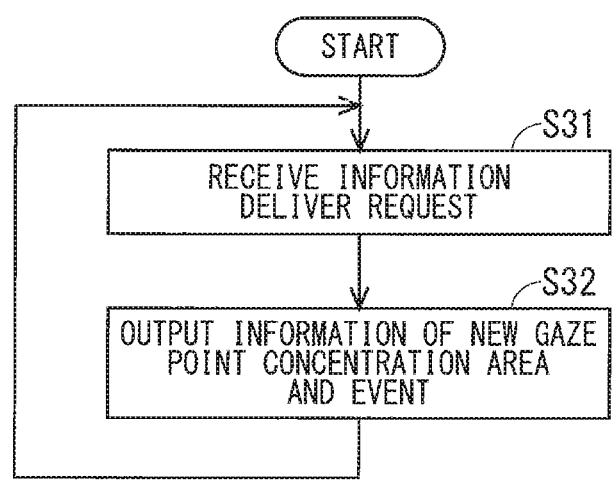
FIG. 13 is a flowchart illustrating a method of delivering information of the new gaze point concentration area and the event according to the second embodiment.

Next, operation of the travel environment analysis apparatus 101 will be described. FIG. 11 is a flowchart illustrating a method of collecting the line-of-sight information according to the second embodiment. FIG. 12 is a flowchart illustrating a method of detecting a new gaze point concentration area and estimating an event according to the second embodiment. FIG. 13 is a flowchart illustrating a method of delivering information of the new gaze point concentration area and the event according to the second embodiment. The operations illustrated in FIG. 11 to FIG. 13 are independent of each other, and the travel environment analysis apparatus 101 executes those operations in parallel.

In Step S11, the line-of-sight information collection unit 40 collects the line-of-sight information from each vehicle 201. The line-of-sight information according to the second embodiment includes information of the individual gaze area recognized in each vehicle 201. Further, the individual gaze area storage 50 stores the information of the individual gaze area of each vehicle 201.

In Step S21, the gaze point concentration area detector 10 detects the gaze point concentration area gazed by a plurality of occupants on the basis of information of a plurality of individual gaze areas.

In Step S22, the gaze point concentration area detector 10 detects the regular gaze point concentration area from the gaze point concentration area on the basis of the predetermined first logic. The regular gaze point concentration area storage 60 stores the regular gaze point concentration area.

In Step S23, the travel environment analysis apparatus 101 determines whether or not determination of the regular gaze point concentration area has completed. For example, when information of regular gaze point concentration areas of the last year is stored in the regular gaze point concentration area storage 60, the travel environment analysis apparatus 101 determines that a learning step of the regular gaze point concentration area has completed for the moment. If determination of the regular gaze point concentration area completes, Step S24 is executed. If determination of the regular gaze point concentration area does not complete, Step S21 is executed again.

In Step S24, the gaze point concentration area detector 10 determines whether or not a new gaze point concentration area is detected. Here, when a gaze point concentration area occurs in an area different from the regular gaze point concentration area before and after a specific time point, the gaze point concentration area detector 10 detects the gaze point concentration area as the new gaze point concentration area. For example, the position Pb of the vehicle 400 involved in the accident illustrated in FIG. 9 is detected as the new gaze point concentration area.

In Step S25, the new gaze point concentration area storage 70 stores the new gaze point concentration area. Note that, when the new gaze point concentration area is not detected as the gaze point concentration area in Step S21, the new gaze point concentration area storage 70 erases the record of the new gaze point concentration area.

In Step S26, the gaze point concentration area event estimation unit 20 estimates the event occurring in the new gaze point concentration area. Here, the gaze point concentration area event estimation unit 20 acquires a geographical attribute to which the new gaze point concentration area belongs on the basis of the position of the new gaze point concentration area and map information of a map database. Then, the gaze point concentration area event estimation unit 20 estimates the event on the basis of the geographical attribute. Alternatively, for example, the gaze point concentration area event estimation unit 20 estimates the event on the basis of a temporal attribute indicating a time-dependent change of a state of the new gaze point concentration area. The event information storage 90 stores the event.

In Step S31, the information output unit 30 receives a deliver request of the information of the new gaze point concentration area and the event. The information output unit 30 receives the delivery request from the outside of the server, that is, the outside of the travel environment analysis apparatus 101. Alternatively, the server automatically detects the vehicle 201 that will travel the new gaze point concentration area, and the information output unit 30 receives the delivery request from the server.

In Step S32, the information output unit 30 outputs information of the new gaze point concentration area and the event.

Figure 14:
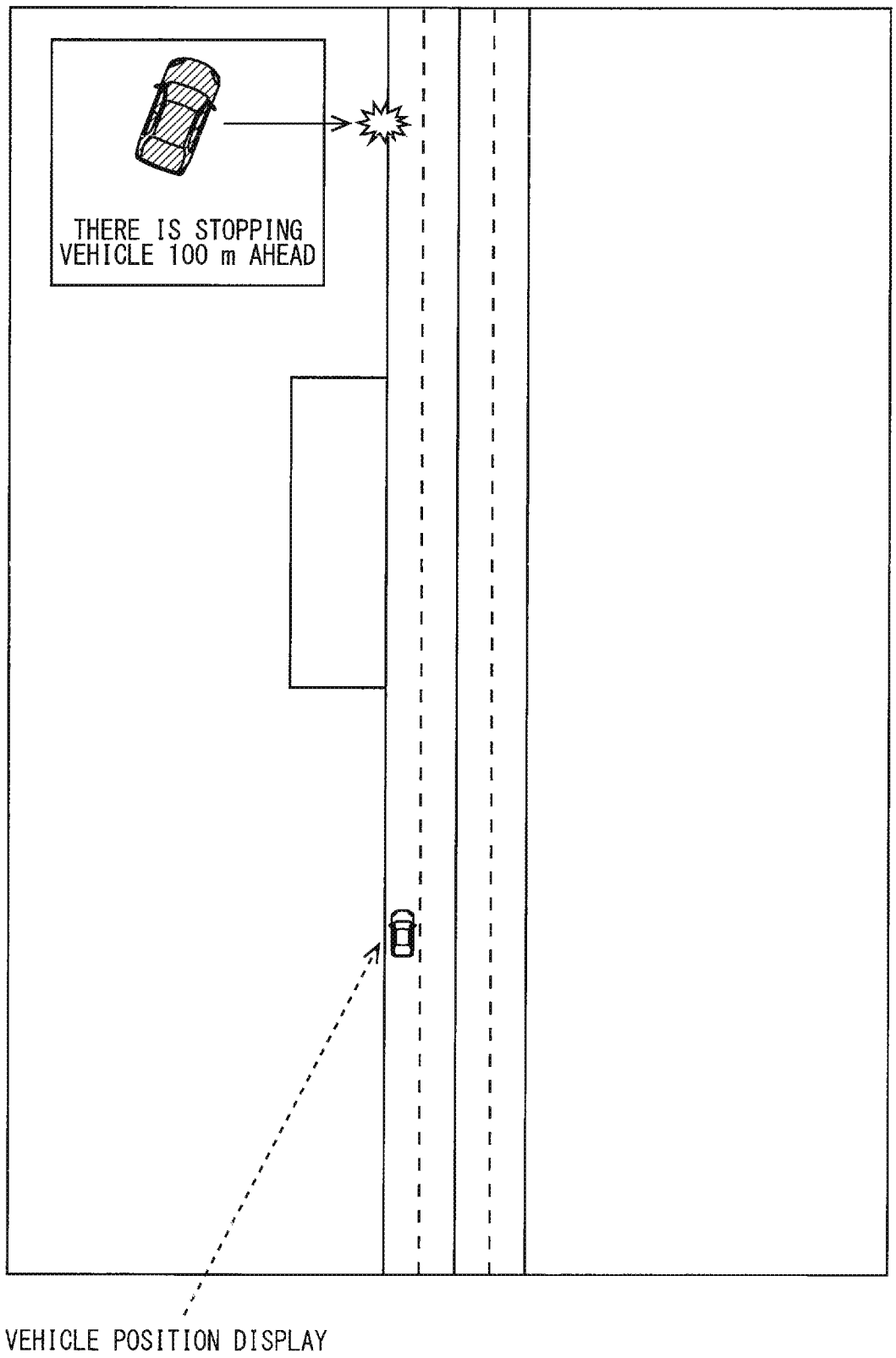
FIG. 14 is a diagram illustrating an example of a warning displayed on a display apparatus.
Figure 15:
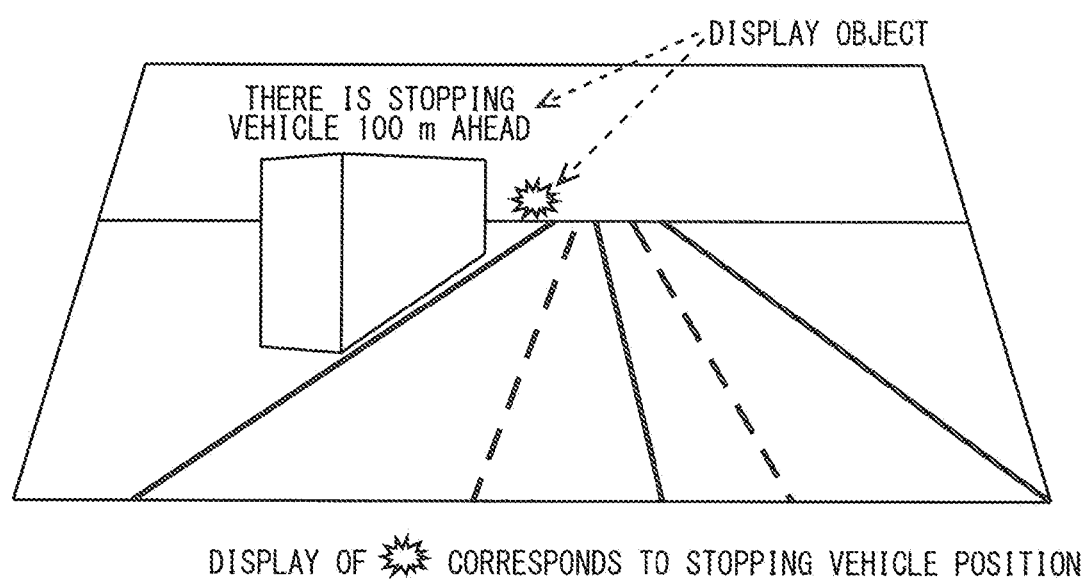
FIG. 15 is a diagram illustrating another example of the warning displayed on the display apparatus.

Here, the information output unit 30 delivers the information of the new gaze point concentration area and the event to the vehicle 201 that will travel near the new gaze point concentration area via the communication network 170. The vehicle 201 that approaches the new gaze point concentration area receives the information of the new gaze point concentration area and the information of the event from the travel environment analysis apparatus 101. The display apparatus 160 of the vehicle 201 displays a warning. FIG. 14 is a diagram illustrating a warning displayed on a display screen of a navigation apparatus as an example of the warning displayed on the display apparatus 160. FIG. 15 is a diagram illustrating a warning displayed on a HUD as another example of the warning displayed on the display apparatus 160. The warning display includes information such as an attribute, the position, an attention degree, and the need of avoidance regarding the event, and the like.

Alternatively, the information output unit 30 may output the information of the new gaze point concentration area and the event to the server. The server performs analysis processing on a road traffic situation on the basis of the information, and for example, a server manager understands the road traffic situation.

Next, the event estimation method in Step S26 described above will be described. As described above, the gaze point concentration area event estimation unit 20 estimates an event on the basis of a geographical attribute or a temporal attribute of the new gaze point concentration area. FIG. 16 is a diagram illustrating a relationship between geographical attributes and temporal attributes of the new gaze point concentration area and estimated events. In FIG. 16, the new gaze point concentration area is classified into five geographical attributes and four temporal attributes.

The first geographical attribute corresponds to on the traffic lane in a travelling direction of one vehicle out of the plurality of vehicles 201. When the position of the new gaze point concentration area belongs to the first geographical attribute, the gaze point concentration area event estimation unit 20 estimates that an event included in a predetermined first event group occurs in the traffic lane. The predetermined first event group refers to an event group described in a row corresponding to the first geographical attribute in FIG. 16. The predetermined first event group includes an event that needs to be avoided. The event that needs to be avoided is, for example, a situation in which a vehicle involved in an accident, a dropped object, damage in a road, destruction in a road, a dangerously driven vehicle, or the like exists.

Further, the gaze point concentration area event estimation unit 20 may determine a traffic lane to be paid attention to on the basis of the traffic lane in which the gaze point concentration area exists. Further, with the travel environment analysis apparatus 101 detecting avoidance operation by using a sensor provided in the vehicle 201, event estimation accuracy is further enhanced.

The second geographical attribute corresponds to near the traffic lane in a travelling direction of one vehicle out of the plurality of vehicles 201. "Near the traffic lane" means a part of a road structure except for the traffic lane, such as a shoulder, a median strip, a sidewalk, and a withdrawal space, a terrestrial object adjacent to a road structure, and the like. The terrestrial object adjacent to a road structure refers to, for example, a terrestrial object that is located within a radius of 10 m from the road structure. When the position of the new gaze point concentration area belongs to the second geographical attribute, the gaze point concentration area event estimation unit 20 estimates that an event included in a predetermined second event group occurs in the traffic lane. The predetermined second event group refers to an event group described in a row corresponding to the second geographical attribute in FIG. 16. The predetermined second event group includes an event that requires attention. The event that requires attention is a situation in which a vehicle involved in an accident, a dropped object, a special vehicle, or the like exists in a pedestrian walkway along a road or a standby area. Alternatively, the event that requires attention is a situation in which a terrestrial object or a person to be paid attention to at the time of travelling of the vehicle 201 exists on a sidewalk. Alternatively, the event that requires attention is a situation in which a newly established point of interest (POI) or an entertainment exists.

The third geographical attribute corresponds to above a travelling road of one vehicle out of the plurality of vehicles 201. When the position of the new gaze point concentration area belongs to the third geographical attribute, the gaze point concentration area event estimation unit 20 estimates that an event included in a predetermined third event group occurs in the travelling road. The predetermined third event group refers to events described in a row corresponding to the third geographical attribute in FIG. 16. The predetermined third event group includes an event that requires attention. The event that requires attention is, for example, a situation in which hindrance to travelling, such as stone dropping, occurs from a road that crosses above the travelling road or from above the travelling road at an angle. Alternatively, the event that requires attention is a situation in which a natural disaster, such as a mudslide, occurs above the travelling road at an angle. Alternatively, the event that requires attention is a situation in which damage in a road or destruction of a road facility occurs.

The fourth geographical attribute corresponds to an oncoming traffic lane with respect to the traffic lane in a travelling direction of one vehicle out of the plurality of vehicles 201, or a road different from the traffic lane. When the position of the new gaze point concentration area belongs to the fourth geographical attribute, the gaze point concentration area event estimation unit 20 estimates that an event included in a predetermined fourth event group occurs in the oncoming traffic lane or the different road. The predetermined fourth event group refers to events described in a row corresponding to the fourth geographical attribute in FIG. 16. The predetermined fourth event group includes an event that needs to be avoided. The event that needs to be avoided is, for example, a situation in which an accident on the oncoming traffic lane, damage of a road facility on the oncoming traffic lane, a reversely travelling vehicle, or a dangerously driven vehicle occurs.

Further, the gaze point concentration area event estimation unit 20 may determine an accuracy degree of event occurrence on the basis of a matching degree between the new gaze point concentration area in the traffic lane in the travelling direction of the vehicle 201 and the new gaze point concentration area in the oncoming traffic lane.

The fifth geographical attribute corresponds to outside of a facility in a travelling road of one vehicle of the plurality of vehicles 201. "Outside of a facility" includes, for example, a distant view different from a road. An area other than the first geographical attribute to the fourth geographical attribute corresponds to the fifth geographical attribute. The gaze point concentration area event estimation unit 20 estimates that an event included in a predetermined fifth event group occurs outside of a facility in the travelling road. The predetermined fifth event group refers to events described in a row corresponding to the fifth geographical attribute in FIG. 16. The predetermined fifth event group includes an event that requires attention but does not have direct influence on travelling of the vehicle. When the position of the new gaze point concentration area is outside of a facility in a road, such as mountains, it is a situation in which a natural disaster occurs as the event that requires attention. Alternatively, it is a situation in which a beautiful view such as that in season or a festival occurs as the event that requires attention. When the position of the new gaze point concentration area is outside of a facility in a road, such as a city area, it is a situation in which fire or a rare view occurs as the event that requires attention. When the position of the new gaze point concentration area is the upper direction outside of a facility in a road, it is a situation in which fireworks go off.

As the first temporal attribute, if the position of the new gaze point concentration area does not change from a specific time point, the gaze point concentration area event estimation unit 20 estimates that an event included in a predetermined sixth event occurs. For example, if the position of the new gaze point concentration area does not change in the unit of several hours, the gaze point concentration area event estimation unit 20 estimates that an event included in a predetermined sixth event group occurs. The predetermined sixth event group refers to events described in a column corresponding to the first temporal attribute in FIG. 16. The predetermined sixth event group includes an event that requires attention. The event that requires attention is a situation in which an accident, an obstruction, a temporary disaster, or the like occurs. Alternatively, the event that requires attention is a situation in which a terrestrial object or a moving object to be paid attention to occurs.

If the gaze point concentration area ends at or after the second specific time point later than the first specific time point, the travel environment analysis apparatus 101 may determine that the event that requires attention ends.

As the second temporal attribute, if the position of the new gaze point concentration area does not change from a specific time point, and the new gaze point concentration area does not end even after the elapse of a specific period, the gaze point concentration area event estimation unit 20 estimates that an event included in a predetermined seventh event group occurs. For example, if the position of the new gaze point concentration area does not change for several hours or more or for several days or more, the gaze point concentration area event estimation unit 20 estimates that an event included in a predetermined seventh event group occurs. The predetermined seventh event group refers to events described in a column corresponding to the second temporal attribute in FIG. 16. The predetermined seventh event group includes an event that requires attention. The event that requires attention is a situation in which sudden damage in a road, sudden damage of a road facility, or a sudden natural disaster occurs and is not recovered.

Note that a new regular gaze point concentration area may occur due to new establishment or closing of a road or the like. In that case, the travel environment analysis apparatus 101 checks the position of the new regular gaze point concentration area against a new road map, and if the travel environment analysis apparatus 101 determines that it is the regular gaze point concentration area, the travel environment analysis apparatus 101 does not estimate that an event of the predetermined seventh event group occurs.

As the third temporal attribute, if the position of the new gaze point concentration area does not change, the ratio of the vehicles 201 in which individual gaze areas gazed by individual occupants riding in their respective vehicles 201 match the new gaze point concentration area has an tendency to increase, and the ratio is a predetermined evaluation value or more, the gaze point concentration area event estimation unit 20 estimates that an event included in a predetermined eighth event group occurs. The predetermined eighth event group refers to events described in a column corresponding to the third temporal attribute in FIG. 16. The predetermined eighth event group includes an event that requires attention. The event that requires attention is a situation in which progression of damage in a road, progression of damage of a road facility, or progression of destruction of the nature occurs.

As the fourth temporal attribute, if the position of the new gaze point concentration area continuously moves, the gaze point concentration area event estimation unit 20 estimates that an event included in a predetermined ninth event group occurs. The predetermined ninth event group refers to events described in a column corresponding to the fourth temporal attribute in FIG. 16. The predetermined ninth event group includes an event that a moving object moving near the new gaze point concentration area exists, and the event requires attention. The event that requires attention is a situation in which a moving object to be paid attention to, such as a dangerously driven vehicle, a reversely travelling vehicle, a suspicious vehicle, a dangerous person, and wandering of a suspicious person, exists. The travel environment analysis apparatus 101 may estimate that the current position of the moving object on the basis of time series information of the moving object.

To summarize the above, the line-of-sight information according to the second embodiment includes information of individual gaze areas gazed by individual occupants riding in each of the plurality of vehicles 201. The line-of-sight information is output from each of the plurality of vehicles 201. The individual gaze area is recognized in each of the plurality of vehicles 201, based on the time series data that is time-dependent data including the position data of each of the plurality of vehicles 201 and the line-of-sight data of the individual occupant.

The travel environment analysis apparatus 101 as described above accurately estimates an event occurring in the new gaze point concentration area on the basis of the information of the individual gaze areas of a plurality of occupants, with the configuration of the travel environment analysis apparatus 101 being simplified. The travel environment analysis apparatus 101 delivers, to the vehicle 201 that will travel in the new gaze point concentration area, an event that needs to be avoided or that requires attention occurring in the area, and performs drive assist of the vehicle 201.

The travel environment analysis apparatus 101 according to the second embodiment can estimate a newly occurring event that requires attention by using the lines of sight of the occupants of the plurality of vehicles 201, unlike the system in which assist is executed by acquiring only the line of sight of the occupant of one vehicle. Further, when an occupant of one vehicle notices an event that requires attention, the travel environment analysis apparatus 101 enables notifying occupants of other vehicles of the event that requires attention.

Further, the gaze point concentration area event estimation unit 20 of the travel environment analysis apparatus 101 according to the second embodiment estimates an event on the basis of the geographical attribute to which the new gaze point concentration area belongs.

The travel environment analysis apparatus 101 as described above accurately estimates, for the vehicle 201 that will travel in the new gaze point concentration area, an event that needs to be avoided or that requires attention occurring in the area.

Further, the gaze point concentration area event estimation unit 20 of the travel environment analysis apparatus 101 according to the second embodiment estimates an event on the basis of the temporal attribute indicating a time-dependent change of a state of the new gaze point concentration area.

The travel environment analysis apparatus 101 as described above accurately estimates, for the vehicle 201 that will travel in the new gaze point concentration area, an event that needs to be avoided or that requires attention occurring in the area.

Further, the travel environment analysis system 301 according to the second embodiment includes the travel environment analysis apparatus 101, the individual gaze area recognition unit 140, and the line-of-sight information output unit 150. The individual gaze area recognition unit 140 is provided in each of the plurality of vehicles 201, and recognizes the individual gaze area gazed by the individual occupant on the basis of the time series data. The line-of-sight information output unit 150 is provided in each of the plurality of vehicles 201, and outputs the information of the individual gaze area to the travel environment analysis apparatus 101 as the line-of-sight information.

The travel environment analysis system 301 as described above accurately estimates an event occurring in the new gaze point concentration area on the basis of the information of the individual gaze areas of a plurality of occupants, with the configuration of the travel environment analysis apparatus 101 being simplified. The travel environment analysis system 301 delivers, to the vehicle 201 that will travel in the new gaze point concentration area, an event that needs to be avoided or that requires attention occurring in the area, and performs drive assist of the vehicle 201.

First Modification of Second Embodiment

The gaze point concentration area event estimation unit 20 may estimate an event of the new gaze point concentration area on the basis of subdivided geographical attributes, image information acquired in the vehicle 201, image recognition results thereof, or the like. Note that the image information acquired in the vehicle 201 is output from the vehicle 201 to the travel environment analysis apparatus 101, together with the line-of-sight information.

According to the configuration as described above, the event estimation logics are advanced, and thus accuracy of event estimation is enhanced.

The gaze point concentration area event estimation unit 20 may estimate an event of the new gaze point concentration area on the basis of vehicle motion information such as an avoidance behavior of the vehicle 201 and a deceleration behavior from the vehicle 201. Note that the vehicle motion information is output from the vehicle 201 to the travel environment analysis apparatus 101, together with the line-of-sight information.

Similarly to the above, the event estimation logics are advanced, and thus accuracy of event estimation is enhanced. When the information related to an avoidance behavior of the vehicle 201 is input, the gaze point concentration area event estimation unit 20 can estimate that it is a situation in which the degree of requiring attention is high.

When the gaze point concentration area detector 10 detects a new gaze point concentration area, the travel environment analysis apparatus 101 may make an inquiry of details of the event to the vehicle 201.

The travel environment analysis apparatus 101 may request the vehicle 201 having capability of transmitting the image information and transmitting the image recognition results to provide detailed information of the gaze point concentration area.

Second Modification of Second Embodiment

The gaze point concentration area detector 10 according to the second embodiment described above calculates the regular gaze point concentration area on the basis of the predetermined first logic, and detects the new gaze point concentration area on the basis of the regular gaze point concentration area. The method of detecting the new gaze point concentration area is not limited to the method.

The gaze point concentration area detector 10 according to the second modification of the second embodiment calculates statistical line-of-sight distribution, which is statistics of the lines of sight of the occupants for detecting the gaze point concentration area per a predetermined zone of a road on the basis of the line-of-sight information and a predetermined second logic. The predetermined second logic corresponds to calculation of the statistical line-of-sight distribution by statistically calculating the line-of-sight information. The line-of-sight information includes, for example, the line-of-sight distribution data according to the second embodiment. Then, when statistical line-of-sight distributions before and after a specific time point are different from each other, the gaze point concentration area detector 10 determines that a new gaze point concentration area occurs.

The statistical line-of-sight distribution may be one average line-of-sight distribution curve, or may be a curve that is expressed with a combination of a plurality of line-of-sight distributions. When the predetermined zone of the road is a crossing, the statistical line-of-sight distribution includes line-of-sight distribution of the vehicle 201 that makes a right turn, line-of-sight distribution of the vehicle 201 that makes a left turn, and line-of-sight distribution of the vehicle 201 that travels straight. When those distributions are averaged, the gaze point concentration area is levelled out, and features are reduced.

Alternatively, the gaze point concentration area detector 10 may detect the new gaze point concentration area with a method illustrated below. When logical line-of-sight distributions and the statistical line-of-sight distributions before and after a specific time point are different from each other, the gaze point concentration area detector 10 determines that a new gaze point concentration area occurs. The logical line-of-sight distribution is distribution of the lines of sight of the occupants estimated from a road structure per the predetermined zone of the road.

When the road structure is a straight road, the logical line-of-sight distribution predominantly has frequency of the front direction. When the road structure is near a crossing, the occupant checks the right and the left, and thus the logical line-of-sight distribution has frequency in a direction of a straight road, a road for a right or left turn, or a crosswalk. When the road structure is a curve, the logical line-of-sight distribution shows a tendency of inclining in the direction of the curve.

Further, the first logic according to the second embodiment and the second logic described above may include processing of determining an accuracy degree that the gaze point concentration area is a new gaze point concentration area, in addition to determining whether or not that gaze point concentration area is a new gaze point concentration area.

Third Modification of Second Embodiment

The travel environment analysis apparatus 101 updates a line-of-sight information analysis program for causing the processing circuit illustrated in FIG. 2 or FIG. 3 to function as the individual gaze area recognition unit 140 and the line-of-sight information output unit 150. The travel environment analysis apparatus 101 delivers the updated program to each of the plurality of vehicles 201. Each vehicle 201 updates its existing program with the program downloaded from the travel environment analysis apparatus 101.

Further, the travel environment analysis system 301 may execute the recognition processing of the individual gaze areas with logics different from each other, according to the function of the system of each individual vehicle 201. Further, the travel environment analysis system 301 may arrange that the line-of-sight information output from individual vehicles 201 to the travel environment analysis apparatus 101 is different from each other.

Third Embodiment

A travel environment analysis apparatus and a travel environment analysis method according to the third embodiment will be described. The third embodiment is a subordinate concept of the first embodiment, and the travel environment analysis apparatus according to the third embodiment includes each configuration of the travel environment analysis apparatus 100 according to the first embodiment. Note that description of configurations and operations similar to those of the first or second embodiment will be omitted.

The travel environment analysis system 301 according to the second embodiment has a configuration of recognizing the individual gaze area in the vehicle 201, but the travel environment analysis system according to the third embodiment has a configuration of recognizing the individual gaze area in the travel environment analysis apparatus.

FIG. 17 is a block diagram illustrating a configuration of a travel environment analysis system 302 and a travel environment analysis apparatus 102 according to the third embodiment.

The individual gaze area recognition unit 140 is provided in the travel environment analysis apparatus 102, instead of a vehicle 202.

The line-of-sight information output unit 150 acquires the position data of the vehicle 202 detected in the locator 120, and the line-of-sight data of individual occupants detected in the line-of-sight detection apparatus 110. Then, the line-of-sight information output unit 150 outputs the position data of the vehicle 202 and the line-of-sight data to the travel environment analysis apparatus 102 as the line-of-sight information related to the line of sight of the occupant.

The line-of-sight information collection unit 40 collects the line-of-sight information from each vehicle 202.

The individual gaze area recognition unit 140 acquires the position data of the vehicle 202 included in the line-of-sight information, and the line-of-sight data of individual occupants. The individual gaze area recognition unit 140 recognizes the individual gaze area for each vehicle 202 on the basis of the time series data of the position data of the vehicle 202 and the line-of-sight distribution data, similarly to the second embodiment.

Figure 18:
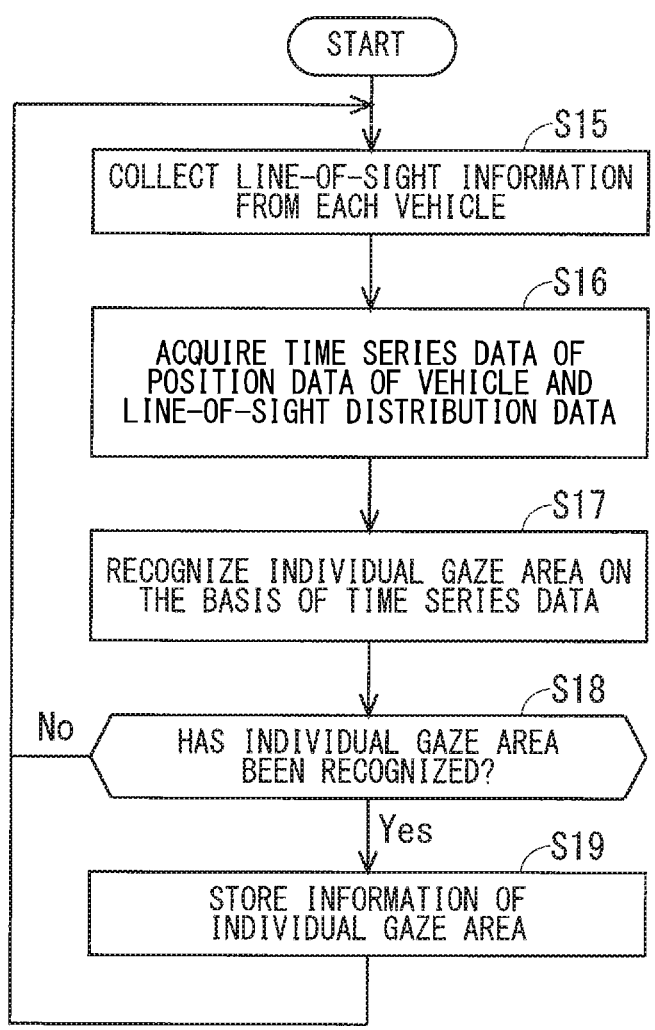
FIG. 18 is a flowchart illustrating recognition operation of the individual gaze area according to the third embodiment.

FIG. 18 is a flowchart illustrating recognition operation of the individual gaze area according to the third embodiment.

In Step S15, the line-of-sight information collection unit 40 collects the line-of-sight information from each vehicle 202. The line-of-sight information according to the third embodiment is information detected in each of the plurality of vehicles 202, and includes the position data and the line-of-sight data of individual occupants of each vehicle 202.

In Step S16, the individual gaze area recognition unit 140 acquires time series data of the position data of the vehicle 202 and the line-of-sight distribution data for each vehicle 202. This step is similar to Step S101 illustrated in FIG. 6.

In Step S17, the individual gaze area recognition unit 140 recognizes the individual gaze area for each vehicle 202, based on the time series data. This step is similar to Step S102 illustrated in FIG. 6.

In Step S18, the individual gaze area recognition unit 140 determines whether or not the individual gaze area has been recognized. If the individual gaze area is recognized, Step S19 is executed. If the individual gaze area is not recognized, Step S15 is executed again. This step is similar to Step S103 illustrated in FIG. 6.

In Step S19, the individual gaze area storage 50 stores information of the individual gaze area for each vehicle 202.

The method of detecting the new gaze point concentration area and the method of estimating the event are similar to the methods illustrated in FIG. 12. Further, the method of delivering the information of the new gaze point concentration area and the event is similar to the method illustrated in FIG. 13.

To summarize the above, the travel environment analysis apparatus 102 according to the third embodiment includes the individual gaze area recognition unit 140. The individual gaze area recognition unit 140 recognizes the individual gaze area gazed by the individual occupant for each of the plurality of vehicles 202, based on the time series data that is the time-dependent data including the position data of each of the plurality of vehicles 202 and the line-of-sight data of the individual occupant riding in each of the plurality of vehicles 202. The line-of-sight information includes the position data detected in each of the plurality of vehicles 202, and the line-of-sight data of the individual occupant. The line-of-sight information is output from each of the plurality of vehicles 202.

The travel environment analysis apparatus 102 as described above enables various types of analysis in the travel environment analysis apparatus 102 although a load of the travel environment analysis apparatus 102 increases in comparison to the travel environment analysis system 302 according to the second embodiment. Further, when a new analysis logic is developed, the analysis logic can be updated by changing the logic of the travel environment analysis apparatus 102 without forcing update of the analysis program of the individual gaze area recognition unit 140 provided in the vehicle 202.

Modification of Third Embodiment

The travel environment analysis system may have a configuration in which the configurations of the second embodiment and the third embodiment are combined. The travel environment analysis system as described above can support both of the vehicle 201 that uploads the individual gaze area as the line-of-sight information as with the case of the second embodiment and the vehicle 202 that uploads the line-of-sight data of the third embodiment as the line-of-sight information.

Note that, in the present invention, each embodiment can be freely combined and each embodiment can be modified or omitted as appropriate within the scope of the invention.

While the invention has been shown and described in detail, the foregoing description is in all aspects illustrative and not restrictive. It is therefore understood that numerous unillustrated modifications can be devised without departing from the scope of the present invention.

EXPLANATION OF REFERENCE SIGNS

10 Gaze point concentration area detector, 20 Gaze point concentration area event estimation unit, 30 Information output unit, 40 Line-of-sight information collection unit, 100 Travel environment analysis apparatus, 110 Line-of-sight detection apparatus, 120 Locator, 140 Individual gaze area recognition unit, 150 Line-of-sight information output unit, 170 Communication network, 200 Vehicle, 301 Travel environment analysis system, 410 Individual gaze area

The invention claimed is:

1. A travel environment analysis apparatus comprising:
   a gaze point concentration area detection circuitry to sequentially detect a gaze point concentration area that is an area outside of a plurality of vehicles and gazed by occupants of the plurality of vehicles, based on line-of-sight information related to lines of sight of the occupants, a first occupant among the occupants being in a first vehicle of the plurality of vehicles, and a second occupant among the occupants being in a second vehicle of the plurality of vehicles;
   a gaze point concentration area event estimation circuitry to estimate, when a new gaze point concentration area which is a gaze point concentration area newly coming up is detected, an event occurring in the new gaze point concentration area; and
   an information output circuitry to output information of the new gaze point concentration area and information of the event.

2. The travel environment analysis apparatus according to claim 1, further comprising
   an individual gaze area recognition circuitry to recognize an individual gaze area gazed by an individual occupant riding in each of the plurality of vehicles gazes for each of the plurality of vehicles, based on time series data that is time-dependent data including position data of each of the plurality of vehicles and line-of-sight data of the individual occupant, wherein
   the line-of-sight information includes the position data detected in each of the plurality of vehicles and the line-of-sight data of the individual occupant, and is output from each of the plurality of vehicles.

3. The travel environment analysis apparatus according to claim 1, wherein
   the line-of-sight information includes information of an individual gaze area gazed by an individual occupant riding in each of the plurality of vehicles, and is output from each of the plurality of vehicles, and
   the individual gaze area is recognized in each of the plurality of vehicles, based on time series data that is time-dependent data including position data of each of the plurality of vehicles and line-of-sight data of the individual occupant.

4. The travel environment analysis apparatus according to claim 3, wherein
   the travel environment analysis apparatus performs update of a line-of-sight information analysis program for recognizing the individual gaze area for the plurality of vehicles.

5. A travel environment analysis system comprising:
the travel environment analysis apparatus according to claim 3;
an individual gaze area recognition circuitry provided in each of the plurality of vehicles, and configured to recognize the individual gaze area gazed by the individual occupant, based on the time series data; and
a line-of-sight information output circuitry provided in each of the plurality of vehicles, and configured to output information of the individual gaze area to the travel environment analysis apparatus as the line-of-sight information.

6. The travel environment analysis apparatus according to claim 1, wherein
the gaze point concentration area event estimation circuitry estimates the event, based on a geographical attribute to which the new gaze point concentration area belongs.

7. The travel environment analysis apparatus according to claim 6, wherein
when the geographical attribute corresponds to on a traffic lane in a travelling direction of one vehicle out of the plurality of vehicles, the gaze point concentration area event estimation circuitry estimates that the event included in a predetermined first event group occurs in the traffic lane, and
the predetermined event group includes an event that needs to be avoided.

8. The travel environment analysis apparatus according to claim 6, wherein
when the geographical attribute corresponds to near a traffic lane in a travelling direction of one vehicle out of the plurality of vehicles, the gaze point concentration area event estimation circuitry estimates that the event included in a predetermined event group occurs in the traffic lane, and
the predetermined second event group includes an event that requires attention.

9. The travel environment analysis apparatus according to claim 6, wherein
when the geographical attribute corresponds to above a travelling road of one vehicle out of the plurality of vehicles, the gaze point concentration area event estimation circuitry estimates that the event included in a predetermined event group occurs in the travelling road, and
the predetermined event group includes an event that requires attention.

10. The travel environment analysis apparatus according to claim 6, wherein
when the geographical attribute corresponds to an oncoming traffic lane in a travelling direction of one vehicle out of the plurality of vehicles, the gaze point concentration area event estimation circuitry estimates that the event included in a predetermined event group occurs in the oncoming traffic lane, and
the predetermined event group includes an event that needs to be avoided.

11. The travel environment analysis apparatus according to claim 6, wherein
when the geographical attribute corresponds to outside of a facility in a travelling road of one vehicle out of the plurality of vehicles, the gaze point concentration area event estimation circuitry estimates that the event included in a predetermined event group occurs outside of the facility the travelling road, and
the predetermined event group includes an event that requires attention but does not have direct influence on travelling of the one vehicle.

12. The travel environment analysis apparatus according to claim 1, wherein
the gaze point concentration area event estimation circuitry estimates the event, based on a temporal attribute indicating a time-dependent change of a state of the new gaze point concentration area.

13. The travel environment analysis apparatus according to claim 12, wherein
as the temporal attribute, if a position of the new gaze point concentration area does not change from a specific time point, the gaze point concentration area event estimation circuitry estimates that the event included in a predetermined event group occurs, and
the predetermined event group includes an event that requires attention.

14. The travel environment analysis apparatus according to claim 12, wherein
as the temporal attribute, if a position of the new gaze point concentration area does not change from a specific time point, and the new gaze point concentration area does not end even after elapse of a specific period, the gaze point concentration area event estimation circuitry estimates that the event included in a predetermined event group occurs, and
the predetermined event group includes an event that requires attention.

15. The travel environment analysis apparatus according to claim 12, wherein
as the temporal attribute, if a position of the new gaze point concentration area does not change, a ratio of vehicles in which an individual gaze area gazed by an individual occupant riding in each of the plurality of vehicles matches the new gaze point concentration area has an tendency to increase, and the ratio is a predetermined evaluation value or more, the gaze point concentration area event estimation circuitry estimates that the event included in a predetermined event group occurs, and
the predetermined event group includes an event that requires attention.

16. The travel environment analysis apparatus according to claim 12, wherein
as the temporal attribute, if a position of the new gaze point concentration area continuously moves, the gaze point concentration area event estimation circuitry estimates that the event included in a predetermined event group occurs, and
the predetermined event group includes an event that a moving object exists in the new gaze point concentration area, the event requiring attention.

17. The travel environment analysis apparatus according to claim 1, wherein
the gaze point concentration area detection circuitry calculates a regular gaze point concentration area that is an area gazed by the occupant regularly, based on the gaze point concentration area sequentially detected on the basis of the line-of-sight information and a predetermined first logic, and
when the gaze point concentration area occurs in an area different from the regular gaze point concentration area before and after a specific time point, the gaze point concentration area detection circuitry determines that the new gaze point concentration area occurs.

18. The travel environment analysis apparatus according to claim 1, wherein
the gaze point concentration area detection circuitry calculates statistical line-of-sight distribution that is statistics of the line of sight of the occupant for detecting the gaze point concentration area per a predetermined zone of a road, based on the line-of-sight information and a predetermined second logic,
when statistical line-of-sight distributions before and after a specific time point are different from each other, the gaze point concentration area detection circuitry determines that the new gaze point concentration area occurs, and
the predetermined second logic calculates the statistical line-of-sight distribution by statistically calculating the line-of-sight information.

19. The travel environment analysis apparatus according to claim 1, wherein
the gaze point concentration area detection circuitry calculates statistical line-of-sight distribution being statistics of the line of sight of the occupant for detecting the gaze point concentration area for each zone of a predetermined road, based on the line-of-sight information and a predetermined second logic,
when logical line-of-sight distributions and statistical line-of-sight distributions before and after a specific time point are different from each other, the gaze point concentration area detection circuitry determines that the new gaze point concentration area occurs,
the predetermined second logic calculates the statistical line-of-sight distribution by statistically calculating the line-of-sight information, and
the logical line-of-sight distribution is distribution of the line of sight of the occupant estimated from a road structure per a predetermined zone of a road.

20. A travel environment analysis method comprising:
sequentially detecting a gaze point concentration area that is an area outside of a plurality of vehicles and gazed by occupants of the plurality of vehicles, based on line-of-sight information related to lines of sight of the occupants, a first occupant among the occupants being in a first vehicle of the plurality of vehicles, and a second occupant among the occupants being in a second vehicle of the plurality of vehicles;
when a new gaze point concentration area which is a gaze point concentration area newly coming up is detected, estimating an event occurring in the new gaze point concentration area; and
outputting information of the new gaze point concentration area and information of the event.

\* \* \* \* \*